United States Patent
Sasaki et al.

(10) Patent No.: US 9,641,057 B2
(45) Date of Patent: May 2, 2017

(54) STEPPER MOTOR

(71) Applicant: DENSO CORPORATION, Kariya, Aichi-pref. (JP)

(72) Inventors: Tatsuya Sasaki, Chiryu (JP); Hideyuki Nakane, Nishio (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 143 days.

(21) Appl. No.: 14/427,905

(22) PCT Filed: Sep. 5, 2013

(86) PCT No.: PCT/JP2013/005272
§ 371 (c)(1),
(2) Date: Mar. 12, 2015

(87) PCT Pub. No.: WO2014/041770
PCT Pub. Date: Mar. 20, 2014

(65) Prior Publication Data
US 2015/0229195 A1    Aug. 13, 2015

(30) Foreign Application Priority Data
Sep. 14, 2012  (JP) .................. 2012-203224

(51) Int. Cl.
*H02K 37/02* (2006.01)
*H02K 7/10* (2006.01)
(Continued)

(52) U.S. Cl.
CPC ............. *H02K 37/24* (2013.01); *B60K 35/00* (2013.01); *F16H 1/20* (2013.01); *G02B 27/01* (2013.01);
(Continued)

(58) Field of Classification Search
CPC .............................. H02K 37/24; H02K 7/116
(Continued)

(56) References Cited

U.S. PATENT DOCUMENTS

| 2002/0011127 A1 | 1/2002 | Torii et al. |
| 2011/0242666 A1 | 10/2011 | Sasaki et al. |
| 2013/0081419 A1 | 4/2013 | Katoh et al. |

FOREIGN PATENT DOCUMENTS

| JP | S53132646 A | 11/1978 |
| JP | S6038968 U | 3/1985 |

(Continued)

OTHER PUBLICATIONS

Machine Translation JP2001012561 (2001).*
(Continued)

*Primary Examiner* — Jose Gonzalez Quinones
(74) *Attorney, Agent, or Firm* — Harness, Dickey & Pierce, P.L.C.

(57) ABSTRACT

A resin portion of an output shaft has a large diameter section, from which one end portion of a rod outwardly projects, and an intermediate diameter section, which extends from the large diameter section in an axial direction and is rotatably supported by a housing. A gear portion is formed in an outer peripheral surface of the large diameter section and is meshed with a final gear. A recess is recessed in the axial direction in the large diameter section and extends in the circumferential direction along an entire circumferential extent of the rod. The intermediate diameter section is continuously filled with resin in a region, which extends from an outer peripheral surface of the rod to an outer peripheral surface of the intermediate diameter section in the radial direction, along the entire circumferential extent of the rod.

2 Claims, 3 Drawing Sheets

(51) Int. Cl.
*H02K 37/24* (2006.01)
*H02K 7/116* (2006.01)
*G02B 27/01* (2006.01)
*B60K 35/00* (2006.01)
*F16H 1/20* (2006.01)
*B60K 37/02* (2006.01)

(52) U.S. Cl.
CPC ......... *G02B 27/0149* (2013.01); *H02K 7/116* (2013.01); *B60K 37/02* (2013.01); *B60K 2350/30* (2013.01); *Y10T 74/19651* (2015.01)

(58) Field of Classification Search
USPC .......................... 310/49.47, 75 R, 83, 98, 99
See application file for complete search history.

(56) References Cited

FOREIGN PATENT DOCUMENTS

| JP | H0939675 A | | 2/1997 |
|---|---|---|---|
| JP | 2001012561 A | * | 1/2001 |
| JP | 2001012561 A | | 1/2001 |
| JP | 2002156007 A | | 5/2002 |
| JP | 2004219662 A | | 8/2004 |
| JP | 2009132221 A | | 6/2009 |
| JP | 2011209617 A | * | 10/2011 |
| JP | 2011209617 A | | 10/2011 |

OTHER PUBLICATIONS

Office Action dated May 12, 2015 in corresponding Japanese Application No. 2012-203224.

International Search Report and Written Opinion (in Japanese with English Translation) for PCT/JP2013/005272, mailed Dec. 10, 2013; ISA/JP.

English translation of Office Action mailed Feb. 9, 2016 in corresponding JP Application No. 2012-203224.

* cited by examiner

STEPPER MOTOR

CROSS REFERENCE TO RELATED APPLICATIONS

This application is a U.S. National Phase Application under 35 U.S.C. 371 of International Application No. PCT/JP2013/005272 filed on Sep. 5, 2013 and published in Japanese as WO 2014/041770 A1 on Mar. 20, 2014. This application is based on and claims the benefit of priority from Japanese Patent Application No. 2012-203224 filed on Sep. 14, 2012. The entire disclosures of all of the above applications are incorporated herein by reference.

TECHNICAL FIELD

The present disclosure relates to a stepper motor of a vehicle head-up display apparatus.

BACKGROUND ART

For example, a motor having a clutch recited in Patent Literature 1 is known as a prior art motor. The motor having the clutch recited in Patent Literature 1 is used as, for example, a drive apparatus for opening and closing a louver of an air conditioner, a drive apparatus of an automatic valve, or a drive apparatus of various rotatable devices, such as a turn table of a microwave oven. The motor having the clutch recited in Patent Literature 1 has speed reducing gears, which include gears meshes with a rotor gear of the motor, and an output shaft, which is driven by a final stage gear among the speed reducing gears.

The output shaft has a pin, which is made of metal, and a synthetic resin portion, which is placed around the pin and is made of resin having flexibility. In the output shaft, one end side of the pin is supported by an intermediate cover of a casing, and an axial intermediate part of the synthetic resin portion is supported by the housing of the motor and is rotatable. Furthermore, a gear part is formed at an outer peripheral part of one axial end side of the synthetic resin portion. A space is formed between the gear part and a support shaft part, which is formed as a wall part of the synthetic resin portion at the outer peripheral part of the pin. This space is opened at the one axial end side of the synthetic resin portion, in which the gear part is formed, and this space extends toward the opposite axial side beyond a supported point of the synthetic resin portion, which is supported by the housing of the motor.

In this type of motor having the clutch, when an excess torque is applied to the gear part, the gear part is deformed toward an inner side of the space, and thereby slipping may occur between the gear part and a gear, which is meshed with the gear part.

However, in Patent Literature 1, the space is formed in the output shaft in such a manner that the space extends in the axial direction beyond the supported point, which is supported by the housing of the motor, in order to implement the clutch function. Therefore, in a case where the motor is used to drive a reflector of the vehicle head-up display apparatus, a weight load of the reflector, vehicle vibrations generated at the time of driving the vehicle, or a shock load generated at the time of opening or closing a door is applied to the output shaft. Thereby, there is a disadvantage of that a large stress is generated at the supported part of the output shaft to result in breakage of the output shaft.

PRIOR ART LITERATURE

Patent Literature

Patent Literature 1: JP2001-12561A

SUMMARY OF THE INVENTION

In view of the above disadvantages, it is an objective of the present disclosure to provide a stepper motor, which can ensure a sufficient strength of an output shaft even in a case where a heavy weight article is connected to the output shaft, and vehicle vibrations, shock load or the like is applied to the output shaft.

In order to achieve the above objective, according to the present disclosure, there is provided a stepper motor for a vehicle head-up display apparatus, which has a reflector that is rotatable and reflects a display light outputted from a display device. The stepper motor includes a housing, an electric motor unit, a speed reducing device and an output shaft. The electric motor unit is received in the housing and outputs a rotational drive force when the electric motor unit is rotated through energization of the electric motor unit. The speed reducing device is received in the housing and has a plurality of gears, which include a final gear. The speed reducing device reduces a rotational speed of rotation generated by the rotational drive force outputted from the electric motor unit through the plurality of gears. The output shaft is rotatably supported by the housing and outwardly extends from the housing. The output shaft is rotated by the rotational drive force transmitted from the final gear to rotate the reflector. The output shaft includes a rod, which is made of metal, a resin portion, which is made of resin, and a gear portion. The rod has one end portion, which is rotatably supported in an inside of the housing, and another end portion, which is opposite from the one end portion and extends outwardly from the housing. The resin portion surrounds the rod in a circumferential direction on a radially outer side of the rod. Furthermore, the resin portion has a base end section, from which the one end portion of the rod outwardly projects, and an axial intermediate section, which extends from the base end section toward the another end portion of the rod in an axial direction and is rotatably supported by a bearing portion of the housing. The gear portion includes a plurality of gear teeth formed in an outer peripheral surface of the base end section and is meshed with the final gear. A recess is recessed in the axial direction in the base end section toward the another end portion of the rod and extends in the circumferential direction along an entire circumferential extent of the rod. The recess is located between the gear portion and the rod in a radial direction. The recess is provided only on a side of the bearing portion of the housing, at which the one end portion of the rod is located, in the axial direction. The axial intermediate section is continuously filled with the resin in a region, which extends from an outer peripheral surface of the rod to an outer peripheral surface of the axial intermediate section in the radial direction, along the entire circumferential extent of the rod.

DESCRIPTION OF EMBODIMENTS

Figure 1:
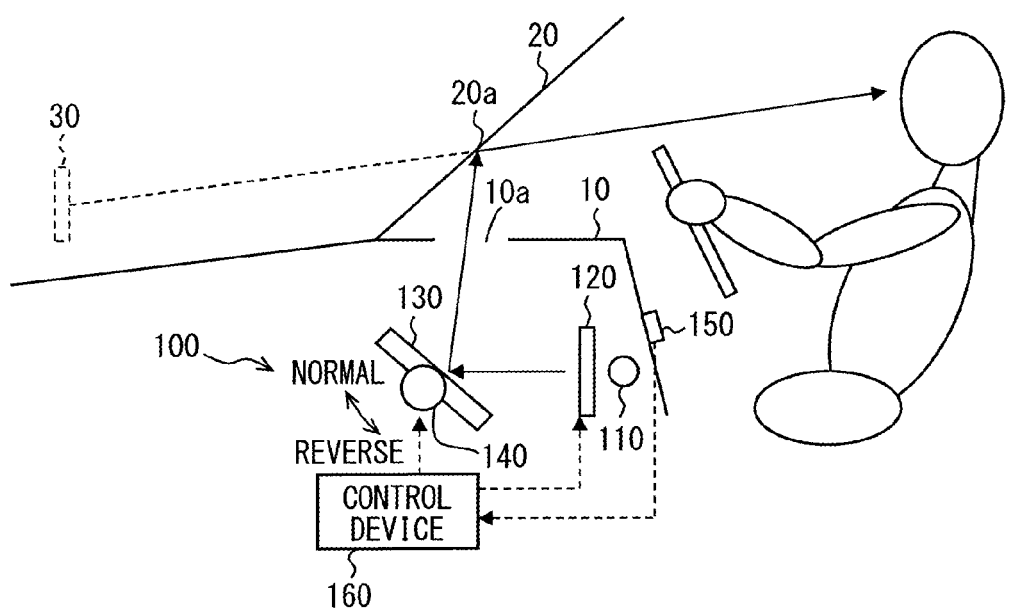
FIG. 1 is a schematic structural diagram showing an entire structure of a vehicle head-up display apparatus according to an embodiment of the present disclosure.

An embodiment of the present disclosure will be described with reference to the accompanying drawings.

A stepper motor 140 according to the embodiment of the present disclosure will be described with reference to FIGS. 1 to 3. The stepper motor 140 of the present embodiment is used for a vehicle head-up display apparatus 100 to rotate a reflector 130 in a rotational direction.

The vehicle head-up display apparatus 100 is applied for the vehicle (e.g., an automobile). In the vehicle head-up display apparatus 100, a display light, which indicates display information and is outputted from a liquid crystal display 120, is inputted to a projecting position 20a of a windshield 20 of the vehicle, and a display image 30 of the display information is displayed (imaged) on a vehicle front side extension line of a line, which connects between a driver of the vehicle and the projecting position 20a to enable the driver to visually recognize the display image 30 as a virtual image. The vehicle head-up display apparatus 100 enables the driver to visually recognize the display image 30 overlapped with a front view of the vehicle. Hereinafter, the vehicle head-up display apparatus 100 will be referred to as "HUD 100".

The windshield 20 is a front windshield of the vehicle, and a laminated glass, which is formed by interposing an intermediate film between two glasses, is used as the windshield 20. The windshield 20 has a small curvature in a left-to-right direction of the vehicle in a view taken from an upper side of the vehicle and a small curvature in a direction along a line of the windshield 20 in a view taken from a lateral side of the vehicle. Because of the same effect as that of a concave mirror, the windshield 20 can magnify the display image 30 and display the magnified display image 30 at a further remote location.

As shown in FIG. 1, the HUD 100 includes a backlight 110, the liquid crystal display 120, the reflector 130, the stepper motor 140, a position adjusting switch 150, and a control device 160. The backlight 110, the liquid crystal display 120, the reflector 130, the stepper motor 140, and the control device 160, which are main components of the HUD 100, are placed in an inside of an instrument panel 10, which extends from a lower end surface of the windshield 20 toward a rear side of a vehicle cabin and also downward. The position adjusting switch 150 is placed at a location where the driver can easily manipulate the position adjusting switch 150, such as a surface of the instrument panel 10, which is opposed to the driver. An opening 10a, through which the display light transmitted from the reflector 130 passes, is formed in an upper surface of the instrument panel 10. Furthermore, a dust cover (not shown), which is transparent, is installed to the opening 10a.

The backlight 110 is a light emitting element, which outputs a light to the liquid crystal display device 120 upon energization of the light emitting element. For example, a light emitting diode (LED) is used as the light emitting element. The backlight 110 outputs the light, which is projected along an optical axis relative to the liquid crystal display 120.

The liquid crystal display 120 is a display device, which projects the display light that indicates the display information. Driving of the liquid crystal display 120 is controlled by a drive circuit of the control device 160. For example, a TFT liquid crystal panel having a thin film transistor (TFT), a dual scan type display (Dual Scan Super Twisted Nematic=D-STN), or a TN (Twisted Nematic) segment liquid crystal is used for the liquid crystal display 120. The liquid crystal display 120 projects the display light of the display information, which is formed on a surface of the liquid crystal display 120 by the light outputted from the backlight 110, toward the reflector 130, which is placed on an opposite side of the liquid crystal display 120 that is opposite from the backlight 110. The surface of the liquid crystal display 120, which projects the display light, is directed in, for example, a vertical direction and is arranged such that an optical axis of the display light is directed in a front-to-back direction of the vehicle (i.e., a projecting direction being directed toward the vehicle front side).

The display information, which is formed by the liquid crystal display 120, may be, for example, map information at a vehicle navigation system, current position information of the own vehicle on the map at the vehicle navigation system, or guide information to a destination at the vehicle navigation system. Alternatively, the display information may be vehicle information at the time of driving the vehicle, such as information of a vehicle speed, an engine rotational speed, an engine coolant temperature, and a battery voltage. The liquid crystal display 120 is constructed to form one of multiple types of information discussed above or a combination selected from the multiple types of information on the surface of the liquid crystal display 120. The driver can select the display information to be displayed through a change switch (not shown).

The reflector 130 is a device that reflects the display light, which is projected from the liquid crystal display 120, to the projecting position 20a of the windshield 20 through the opening 10a of the instrument panel 10. The reflector 130 has a concave mirror, which is installed to a metal frame, which is configured into an elongated tetragon shape. The reflector 130 is rotatably supported relative to a support body, which supports the reflector 130, in such a manner that a longitudinal direction of the reflector 130 coincides with a width direction of the vehicle.

Figure 2:
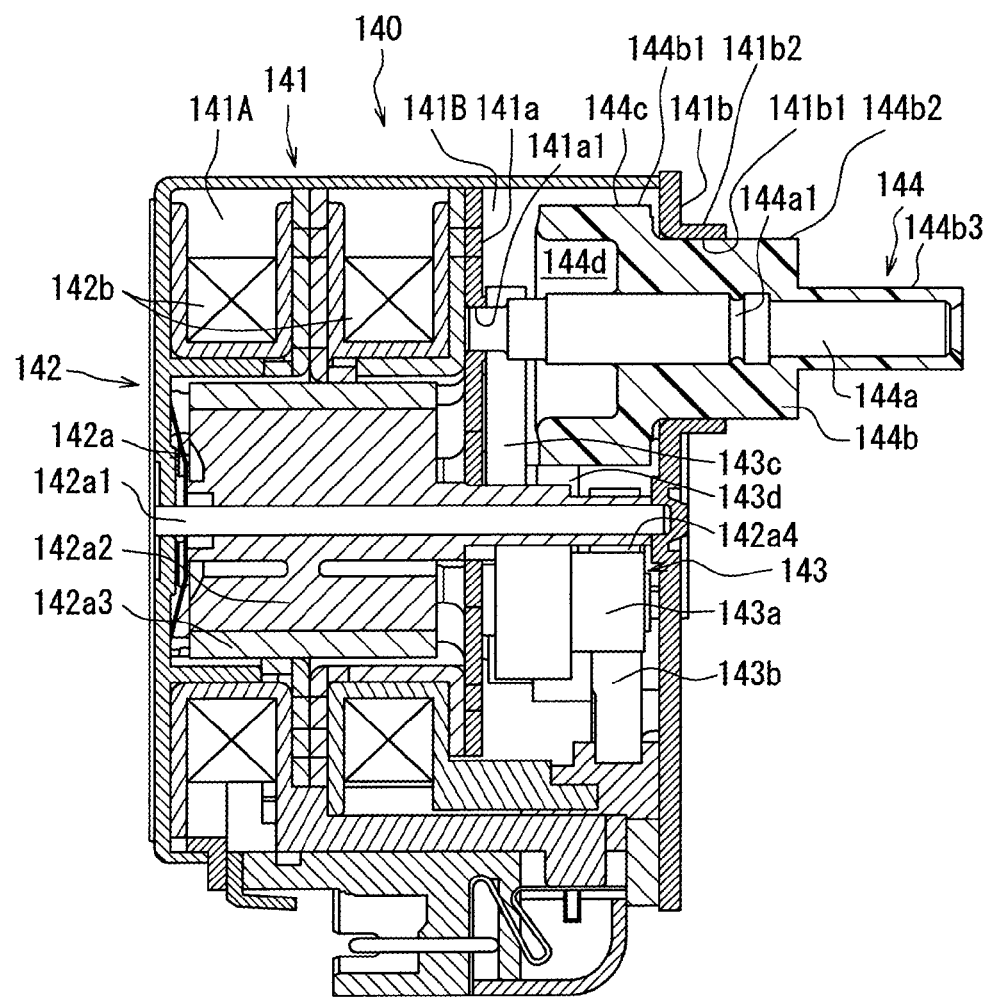
FIG. 2 is a cross-sectional view showing a stepper motor of FIG. 1.
Figure 3:
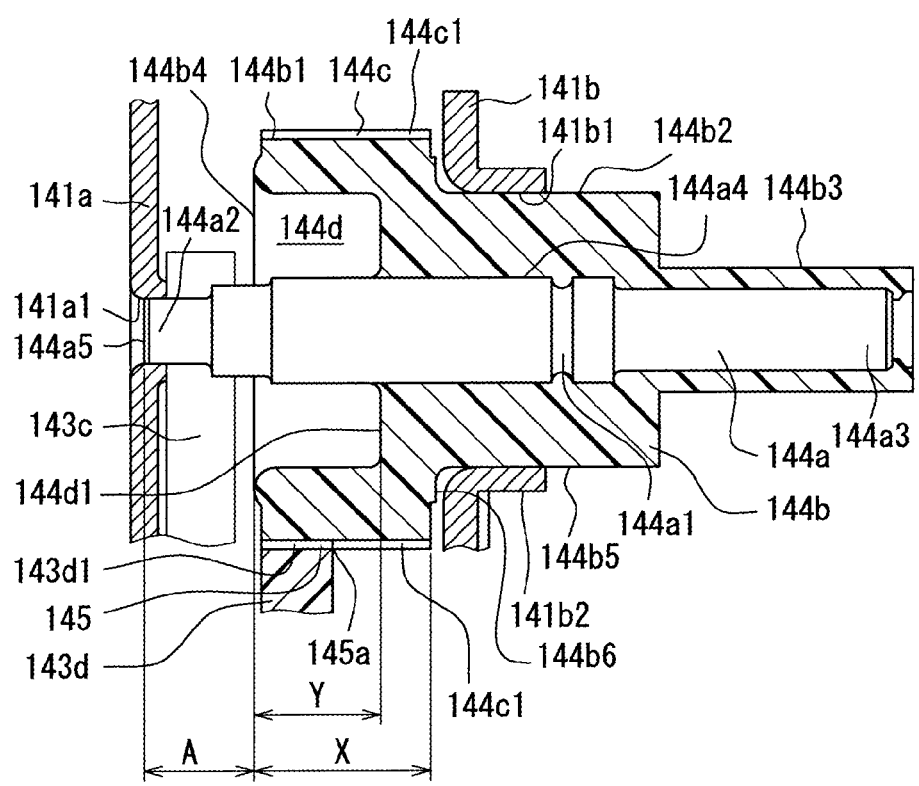
FIG. 3 is a cross-sectional view showing an output shaft of the stepper motor of FIG. 2.

As shown in FIGS. 2 and 3, the stepper motor 140 is a motor, which rotates the reflector 130 in the rotational direction. The stepper motor 140 has an electric motor unit (hereinafter referred to as a motor unit) 142, a speed reducing device 143, and an output shaft 144, which are received in a housing 141. A distal end portion of the output shaft 144 projects outward from the housing 141.

The housing 141 is a case, which is configured into a cylindrical tubular form. The housing 141 has an intermediate plate 141a at an axial middle portion of the housing 141 to partition an inside of the housing 141 into a first space 141A, which is for receiving the motor unit 142, and a second space 141B, which is for receiving the speed reducing device 143 and the output shaft 144. A support hole 141a1 is formed in the intermediate plate 141a at a position (a position that corresponds to the output shaft 144), which is located on an upper side of the axis of the housing 141. Furthermore, one end surface of the housing 141, which is located at one axial end of the housing 141 in the axial direction, is formed by an upper plate 141b. A cylindrical tubular portion 141b2, which functions as a bearing portion, projects from the upper plate 141b along the axis of the housing 141 at the position (the position that corresponds to the output shaft 144), which is located on the upper side of the axis of the housing, and the cylindrical tubular portion 141b2 is formed integrally with the upper plate 141b. A support hole 141b1, which extends through the cylindrical tubular portion 141b2 in the axial direction, is formed on a radially inner side of the cylindrical tubular portion 141b2.

The motor unit 142 includes a rotor 142a and stator coils (stator) 142b and is received in the housing 141. In the rotor 142a, a rotor core 142a2 is fixed to the shaft 142a1, and magnets 142a3 are fixed to an outer peripheral portion of the rotor core 142a2. The rotor core 142a2 and the magnets 142a3 are received in the first space 141A, and a distal end side of the shaft 142a1 extends into the second space 141B. A shaft gear 142a4 is provided to the distal end portion of the shaft 142a1. The stator coils 142b are formed by, for example, two-phase coils (windings), which are fixed between the magnets 142a3 and the inner peripheral surface of the housing 141 in the first space 141A, and the motor unit 142 is formed as a two-phase motor.

The speed reducing device 143 includes a plurality of speed reducing gears, which are meshed one after another in series, i.e., a first gear 143a, a second gear 143b, a third gear 143c and a fourth gear 143d, and the speed reducing device 143 is received in the second space 141B. The shaft gear 142a4 is meshed with the first gear 143a. The speed reducing device 143 conducts an output of the shaft 142a1, i.e., rotation (a rotational speed and a torque) of a rotational drive force of the shaft 142a1 to the output shaft 144, which serves as a final output portion, through the first to fourth gears 143a-143d to provide rotation of a low speed and a high torque to the output shaft 144.

The output shaft 144 is a shaft that conducts the output, the rotational speed of which is reduced by the speed reducing device 143, to the reflector 130. The output shaft 144 includes a rod (also referred as a shaft) 144a, a resin portion 144b, a gear portion 144c and a recess 144d. One end side of the output shaft 144 is received in the second space 141B, and the other end side of the output shaft 144 is exposed to the outside of the housing 141 through the support hole 141b1 of the cylindrical tubular portion 141b2.

The rod 144a is made of metal, such as stainless steel. A stepped portion is formed at the one end side of the rod 144a to reduce an outer diameter of the rod 144a to some degree, and a groove 144a1 is formed in a middle portion of the rod 144a. The groove 144a1 is an annular groove that extends along an outer peripheral surface 144a4 of the rod 144a in a circumferential direction along an entire circumferential extent of the rod 144a and is radially inwardly recessed.

The resin portion 144b is a tubular portion, which is made from resin, such as polybutylene terephthalate (PBT) through a resin molding process. The resin portion 144b circumferentially surrounds the rod 144a on a radially outer side of the rod 144a and is fixed to the outer peripheral surface 144a4 of the rod 144a. Furthermore, removal of the resin portion 144b from the rod 144a is limited by the groove 144a1, which is formed in the outer peripheral surface 144a4 of the rod 144a. Specifically, relative movement between the resin portion 144b and the rod 144a is limited by filling the resin in the groove 144a1. The resin portion 144b is formed such that a large diameter section 144b1, an intermediate diameter section 144b2, which has an outer diameter that is smaller than an outer diameter of the large diameter section 144b1, and a small diameter section 144b3, which has an outer diameter that is smaller than the outer diameter of the intermediate diameter section 144b2, are arranged one after another in this order from one end side to the other end side (the distal end side) of the resin portion 144b in the axial direction. The large diameter section 144b1, the intermediate diameter section 144b2 and the small diameter section 144b3 are formed as cylindrical tubular portions, respectively, which have the different outer diameters, respectively. The large diameter section 144b1 corresponds to a base end section of the present disclosure. The intermediate diameter section 144b2 corresponds to an axial intermediate section of the present disclosure. A location of one end 144b4 of the large diameter section 144b1, which is opposite from the intermediate diameter section 144b2, is set to a location, which is spaced by a predetermined dimension A from an end surface (distal end) 144a5 of one end portion 144a2 of the rod 144a, which projects from the large diameter section 144b1. Furthermore, a location of the other end of the small diameter section 144b3, which is opposite from the intermediate diameter section 144b2, is set to a location, at which the other end of the small diameter section 144b3 covers the other end portion 144a3 of the rod 144a, which is opposite from the one end portion 144a2 of the rod 144a.

The gear portion 144c, which is meshed with a fourth gear (final gear) 143d of the speed reducing device 143, is formed in the outer peripheral surface of the large diameter section 144b1. The gear portion 144c includes a plurality of gear teeth 144c1, which are arranged one after another in a circumferential direction. Furthermore, the recess 144d is recessed in the one end 144b4 of the large diameter section 144b1, which is opposite from the intermediate diameter section 144b2, in such a manner that the recess 144d is recessed to a predetermined location in the axial direction toward the other end portion 144a3 of the rod 144a. The recess 144d is an annular recess, which extends in the circumferential direction along the entire circumferential extent of the rod 144a and is located between the gear portion 144c and the rod 144a in the radial direction. The recess 144d axially extends beyond an end 145a of a meshing portion 145, in which the gear teeth 144c1 of the gear portion 144c and the gear teeth 143d1 of the fourth gear 143d are meshed with each other, to a corresponding location, which is located on an axial side of the end 145a of the meshing portion 145 where the intermediate diameter section 144b2 and the other end portion 144a3 of the rod 144a are placed. However, the recess 144d is formed only on an axial side of the cylindrical tubular portion 141b2 of the upper plate 141b of the housing 141 where the one end portion 144a2 of the rod 144a is placed. Therefore, in the present embodiment, a bottom portion 144d1 of the recess 144d is axially placed between the end 145a of the meshing portion 145 and the cylindrical tubular portion 141b2.

A radial position of the recess 144d is set to be from a location of the outer peripheral surface 144a4 of the rod 144a to a location, at which a predetermined wall thickness of the gear portion 144c is ensured, and the outer peripheral surface 144a4 of the rod 144a is exposed in an inside of the recess 144d. Furthermore, an axial dimension (an entire length) of the recess 144d is set to have a corresponding dimension Y from the one end 144b4 of the large diameter section 144b1. Here, it is assumed that the axial dimension (the entire length) of the gear teeth 144c1 of the gear portion 144c is denoted by X. In such a case a ratio of the dimension Y/dimension X is set to be equal to or less than 1, more specifically equal to or less than 0.725. Therefore, the intermediate diameter section 144b2 and the small diameter section 144b3 are formed as portions, which are entirely filled with the resin.

The output shaft 144, which is formed in the above described manner, is supported at two points relative to the housing 141 and is rotatable, as will be described below. Specifically, the one end portion 144a2 of the rod 144a is inserted into the support hole 141a1 of the intermediate plate 141a and is supported by the support hole 141a1 of the intermediate plate 141a. Furthermore, the intermediate diameter section 144b2 is received through the support hole 141b1 of the cylindrical tubular portion 141b2 of the upper plate 141b, and the outer peripheral surface 144b5 of the intermediate diameter section 144b2 is supported such that the outer peripheral surface 144b5 of the intermediate diameter section 144b2 slidably contacts an inner peripheral surface of the support hole 141b1 of the cylindrical tubular portion 141b2. An annular shoulder portion 144b6, which contacts the upper plate 141b at the time of moving the output shaft 144 in the axial direction, is formed in the other end of the large diameter section 144b1, which is located on the intermediate diameter section 144b2 side. The shoulder portion 144b6 projects on the intermediate diameter section 144b2 side of the gear teeth 144c1 in the axial direction to limit the contact of the gear teeth 144c1 with the upper plate 141b.

A portion of the speed reducing device 143, more specifically, a portion of the third gear 143c, which is an intermediate gear located in a drive force transmission path between the motor unit 142 and the fourth gear 143d, is placed in a predetermined radial region, which extends in a radial direction of the rod 144a and corresponds to the predetermined dimension A, i.e., is placed in a predetermined radial region between the intermediate plate 141a and the one end 144b4 of the large diameter section 144b1.

Referring back to FIG. 1, the position adjusting switch 150 serves as an input device, which generates a request signal for adjusting a position of the display image 30 on the windshield 20 upon input manipulation of the position adjusting switch 150 by the driver toward the upper side or the lower side according to a preference of the driver. The position adjusting switch 150 includes a switch surface. For example, the switch surface is configured into a square form and is opposed to the driver. When an upper side of the switch surface of the position adjusting switch 150 is depressed, a demand signal, which changes the position of the display image 30 toward the upper side, is generated. Furthermore, when a lower side of the switch surface of the position adjusting switch 150 is depressed, a demand signal, which changes the position of the display image 30 toward the lower side, is generated. The generated demand signal is outputted to the control device 160.

The control device 160 serves as a control means for controlling the display information of the liquid crystal display 120 and controlling the operation of the stepper motor 140 based on the demand signal of the position adjusting switch 150 and an on/off signal of an ignition switch.

The HUD 100 is constructed in the above-described manner. A basic operation of the HUD 100, which is executed by the control device 160, will be described.

When the ignition switch of the vehicle is turned on, the control device 160 determines the display information to be displayed based on an instruction of the driver and operates the liquid crystal display 120 to form the display information through the drive circuit.

Then, as shown in FIG. 1, the liquid crystal display 120 outputs the display information as the display light to the reflector 130 through use of the light outputted from the backlight 110. The reflector 130 reflects the display light, which is outputted from the liquid crystal display 120, to the projecting position 20a of the windshield 20 through the opening 10a (the dust cover). The display light (the display information), which is reflected to the projecting position 20a, is imaged as the display image 30 (a virtual image) on the vehicle front side extension line (the front view of the driver) of the line, which connects between the driver and the projecting position 20a, and is visually recognized by the driver.

The control device 160 drives the stepper motor 140 based on the demand signal outputted from the position adjusting switch 150 to rotate the reflector 130, so that the position (hereinafter referred to as a rotational position) of the reflector 130 in the rotational direction is adjusted. In this way, the position of the display image 30 relative to the windshield 20 is adjusted in the top-to-bottom direction, so that the position of the display image 30 is adjusted to a driver's set position, which is demanded by the driver.

Furthermore, when the ignition switch is turned off, the control device 160 drives the stepper motor 140 to rotate the reflector 130 such that the position of the display image 30 relative to the windshield 20 is changed from the driver's set position to a predetermined reset position. Furthermore, when the ignition switch is turned on once again for the next driving, the control device 160 drives the stepper motor 140 to rotate the reflector 130 such that the position of the display image 30 relative to the windshield 20 is returned from the reset position to the driver's set position.

At the time of driving the stepper motor 140, the control device 160 energizes the stator coils 142b to excite the stator coils 142b, so that the rotor 142a is rotated. A rotational output of the rotor 142a, i.e., the rotation generated by the rotational drive force is conducted from the shaft gear 142a4 to the speed reducing device 143 (the first to fourth gears 143a-143d), and the speed of the rotation is reduced in the speed reducing device 143 and is conducted to the gear portion 144c of the output shaft 144. In the output shaft 144, the one end portion 144a2 of the rod 144a is rotatably supported by the support hole 141a1, and the intermediate diameter section 144b2 is rotatably supported by the support hole 141b1. In this way, the output shaft 144 is rotated while the output shaft 144 is supported at the two points, so that the reflector 130 is rotated.

In the present embodiment, the output shaft 144 includes the rod 144a, which is made of the metal, and the resin portion 144b, which is made of the resin. The recess 144d is formed in the one end 144b4 of the large diameter section 144b1 such that the recess 144d is recessed from the one end 144b4 of the large diameter section 144b1 to the predetermined location in the axial direction toward the other end portion 144a3 of the rod 144a. Furthermore, the intermediate diameter section 144b2 of the resin portion 144b is formed to be filled with the resin.

In this way, at the one end of the resin portion 144b in the axial direction, the recess 144d is formed at the position, which corresponds to the gear portion 144c. Therefore, at the time of forming the gear portion 144c, formation of a sink mark in the resin can be limited, and thereby the dimension accuracy of the gear portion 144c can be improved.

Furthermore, the intermediate diameter section 144b2 of the resin portion 144b, which is rotatably supported by the support hole 141b1 of the cylindrical tubular portion 141b2 of the housing 141, is a region, which is filled with the resin and thereby does not form the recess 144d. Specifically, the intermediate diameter section 144b2, which is rotatably supported by the cylindrical tubular portion 141b2, is continuously filled with the resin in the region, which extends from the outer peripheral surface 144a4 of the rod 144a to the outer peripheral surface 144b5 of the intermediate diameter section 144b2 in the radial direction, along the entire circumferential extent of the rod 144a. Thus, in the resin portion 144b, even when a weight load of the reflector 130, a vibration load generated at the time of driving the vehicle, or a shock load generated at the time of opening or closing the door is applied to the resin portion 144*b*, a stress concentrating portion is not formed, and thereby a sufficient strength can be achieved.

Furthermore, the portion of the speed reducing device 143 (specifically, the portion of the third gear 143*c*) is placed in the predetermined region, which corresponds to the predetermined dimension A. In this way, the speed reducing device 143 can be set while the space in the housing 141 is effectively used.

Furthermore, the ratio of the dimension Y of the recess 144*d*, which is measured in the axial direction of the resin portion 144*b*, relative to the dimension X of the gear teeth 144*c*1 of the gear portion 144*c*, which is measured in the axial dimension of the resin portion 144*b*, is set to be equal to or less than 0.725. In this way, the dimensional accuracy improvement of the gear portion 144*c*, which is implemented by the recess 144*d*, and the strength improvement, which is implemented by the non-hollow portion of the intermediate diameter section 144*b*2 of the resin portion 144*b* (the radial portion, which is located between the outer peripheral surface 144*a*4 of the rod 144*a* and the outer peripheral surface 144*b*5 of the intermediate diameter section 144*b*2 and is continuously filled with the resin), can be both satisfied in good balance.

(Other Embodiments)

In the above embodiment, the portion of the speed reducing device 143 (the portion of the third gear 143*c*) is placed in the predetermined region, which corresponds to the predetermined dimension A. However, the present disclosure is not limited to this construction. In a case where a sufficient space can be provided in the housing 141, the location of the third gear 143*c* may be changed to minimize the gap between the intermediate plate 141*a* and the one end of the resin portion 144*b*.

Furthermore, the ratio of the dimension Y of the recess 144*d* relative to the dimension X of the gear teeth 144*c*1 of the gear portion 144*c* is set to be equal to or less than 0.725. Alternatively, this ratio may be adjusted within a range, in which the recess 144*d* does not enter the region of the cylindrical tubular portion 141*b*2.

Furthermore, the resin portion 144*b* has been described to be made of the large diameter section 144*b*1, the intermediate diameter section 144*b*2, and the small diameter section 144*b*3. However, the present disclosure is not limited to this construction. There may be possible to have various other modifications. For example, the resin portion 144*b* may have the same outer diameter along the entire extent of the resin portion 144*b*. Alternatively, the intermediate diameter section 144*b*2 and the small diameter section 144*b*3 may have the same outer diameter.

Furthermore, the speed reducing device 143 is described to be received in the housing 141 (the second space 141B). Alternatively, the speed reducing device 143 may be placed at the outside of the housing 141.

Furthermore, in the HUD 100, the display light, which is outputted from the liquid crystal display 120, has been described to be reflected by the reflector 130. Alternatively, the display light, which is outputted from the liquid crystal display 120, may be first reflected by, for example, a plane mirror and thereafter outputted to the reflector 130.

Furthermore, in the above description, the TFT liquid crystal panel, the dual scan type display, or the TN segment liquid crystal is used for the liquid crystal display (the display device) 120. However, the present disclosure is not limited to this type. For example, the liquid crystal display (display device) 120 may be changed to a display device of self-luminous type, such as electroluminescence type. Further alternatively, the liquid crystal display (display device) 120 may be changed to a laser projector, at which a laser is scanned.

What is claimed is:

1. A stepper motor for a vehicle head-up display apparatus, which has a reflector that is rotatable and reflects a display light outputted from a display device, the stepper motor comprising:
   a housing;
   an electric motor unit that is received in the housing and outputs a rotational drive force when the electric motor unit is rotated through energization of the electric motor unit;
   a speed reducing device that is received in the housing and has a plurality of gears, which include a final gear, wherein the speed reducing device reduces a rotational speed of rotation generated by the rotational drive force outputted from the electric motor unit through the plurality of gears; and
   an output shaft that is rotatably supported by the housing and outwardly extends from the housing, wherein the output shaft is rotated by the rotational drive force transmitted from the final gear to rotate the reflector, wherein:
   the output shaft includes:
      a rod that is made of metal and has one end portion, which is rotatably supported in an inside of the housing, and another end portion which is opposite from the one end portion and extends outwardly from the housing;
      a resin portion that is made of resin and surrounds the rod in a circumferential direction on a radially outer side of the rod, wherein the resin portion has a base end section, from which the one end portion of the rod outwardly projects, and an axial intermediate section, which extends from the base end section toward the another end portion of the rod in an axial direction and is rotatably supported by a bearing portion of the housing; and
      a gear portion, which includes a plurality of gear teeth formed in an outer peripheral surface of the base end section and is meshed with the final gear;
   a recess is recessed in the axial direction in the base end section toward the another end portion of the rod and extends in the circumferential direction along an entire circumferential extent of the rod;
   the recess is located between the gear portion and the rod in a radial direction;
   the recess is provided only on a side of the bearing portion of the housing, at which the one end portion of the rod is located, in the axial direction;
   the axial intermediate section is continuously filled with the resin in a region, which extends from an outer peripheral surface of the rod to an outer peripheral surface of the axial intermediate section in the radial direction, along the entire circumferential extent of the rod; and
   a ratio of an entire length of the recess, which is measured in the axial direction, relative to an entire length of the plurality of gear teeth of the gear portion, which is measured in the axial direction, is set to be equal to or smaller than 0.725.

2. The stepper motor according to claim 1, wherein the plurality of gears of the speed reducing device includes an intermediate gear, which is located in a drive force transmission path between the electric motor unit and the final gear, and the intermediate gear is placed in a predetermined region, which is located between a distal end of the one end portion of the rod and the base end section of the resin portion in the axial direction.

* * * * *